Dec. 7, 1971   V. CIAMPOLINI   3,624,913
METHOD AND APPARATUS FOR MEASURING DIFFERENTIAL MAGNITUDES
Filed April 9, 1970   3 Sheets-Sheet 1

INVENTOR
VALERIO CIAMPOLINI

BY Stevens, Davis, Miller & Mosher
ATTORNEYS

Dec. 7, 1971 V. CIAMPOLINI 3,624,913
METHOD AND APPARATUS FOR MEASURING DIFFERENTIAL MAGNITUDES
Filed April 9, 1970 3 Sheets-Sheet 2

INVENTOR
VALERIO CIAMPOLINI

BY Stevens, Davis, Miller & Mosher
ATTORNEYS

Dec. 7, 1971  V. CIAMPOLINI  3,624,913
METHOD AND APPARATUS FOR MEASURING DIFFERENTIAL MAGNITUDES
Filed April 9, 1970  3 Sheets-Sheet 3

INVENTOR
VALERIO CIAMPOLINI

BY *Stevens, Davis, Miller & Mosher*
ATTORNEYS

United States Patent Office 3,624,913
Patented Dec. 7, 1971

3,624,913
METHOD AND APPARATUS FOR MEASURING
DIFFERENTIAL MAGNITUDES
Valerio Ciampolini, Milan, Italy, assignor to
Industrie Pirelli S.p.A., Milan, Italy
Filed Apr. 9, 1970, Ser. No. 26,956
Claims priority, application Italy, Apr. 14, 1969,
15,530/69
Int. Cl. G01b 5/00
U.S. Cl. 33—172 R                                     20 Claims

ABSTRACT OF THE DISCLOSURE

A method and apparatus for measuring differential magnitudes between two predetermined limit values with a comparator the method comprising a first measuring of the surface of the object under study to calibrate the comparator so that the selected limit value from which the differential will be measured coincides with the predetermined base value and then conducting a second measuring to determine the differential of the surface from the selected limit value; the apparatus comprising three sensing elements operatively connected to the comparator, two of the elements normally being held against relative movement but activated by two resilient elements one of which is adapted to overcome the resistance to relative movement of the two sensing elements, the other resilient element adapted to maintain the third sensing element in continuous contact with the other two sensing elements.

---

The present invention relates to a method and an apparatus for measuring a differential magnitude taking as constant base value that corresponding to any of the two measured limit values.

At present, when differential magnitudes are to be measured, in particular on elements not having well defined nominal sizes, two readings are taken with a measuring instrument. These readings correspond to the minimum and to the maximum value indicated by the instrument during the examination of the element, and then the difference between said values is evaluated.

The measuring instrument can be a comparator provided with a sensing rod, whose axial displacement determinates the displacement of a pointer on a dial. If it is wished to automate the operation, it is moreover necessary to employ a transducer able to read and memorize the maximum and minimum values of the measured magnitude, and a computer, able to compute and indicate the difference between said values, both apparatuses being complicated and consequently unreliable and expensive.

In one form the present invention is an expeditious, economical and reliable method for the determination of a differential magnitude. The method consists in carrying out a first relative measurement between the sensing element of the comparator and the surface of the element to be examined along the whole development of the surface of the latter in order to automatically cause the comparator reading which corresponds to one of the limit values to be measured on said element to coincide with a pre-established base value on said comparator; in carrying out a second relative measurement, equal to the first and having the same direction or an opposite direction, between said surface and the sensing element in contact with it, and in taking, during said second measurement, the value corresponding to the maximum displacement of the pointer of the comparator from said base value or, more simply, in determining whether said maximum value exceeds one or more preestablished allowable limits.

In another form the present invention consists in an apparatus for carrying out the above described method. The apparatus comprises a sensing shank axially shiftable in both directions independently of or integrally with a rod which is also axially shiftable within two pre-established limits, and operatively connected to a measurement indicating device, an element able to resist the independent shifting of the shank and of the rod, a first resilient element acting on said rod to move it toward the feeling shank, and a second resilient element acting on the shank to detach it from the rod, the resistance to said independent shifting being always of a value greater than the thrust exerted by the first resilient element on the rod, and always smaller than the thrust exerted by the second resilient element on the shank.

The features and the advantages of the method and the apparatus forming the object of the present invention will be more clearly understood from the following description, made with reference to embodiments which are illustrated, by way of non-limiting examples in the attached drawings, in which.

Figure 1:
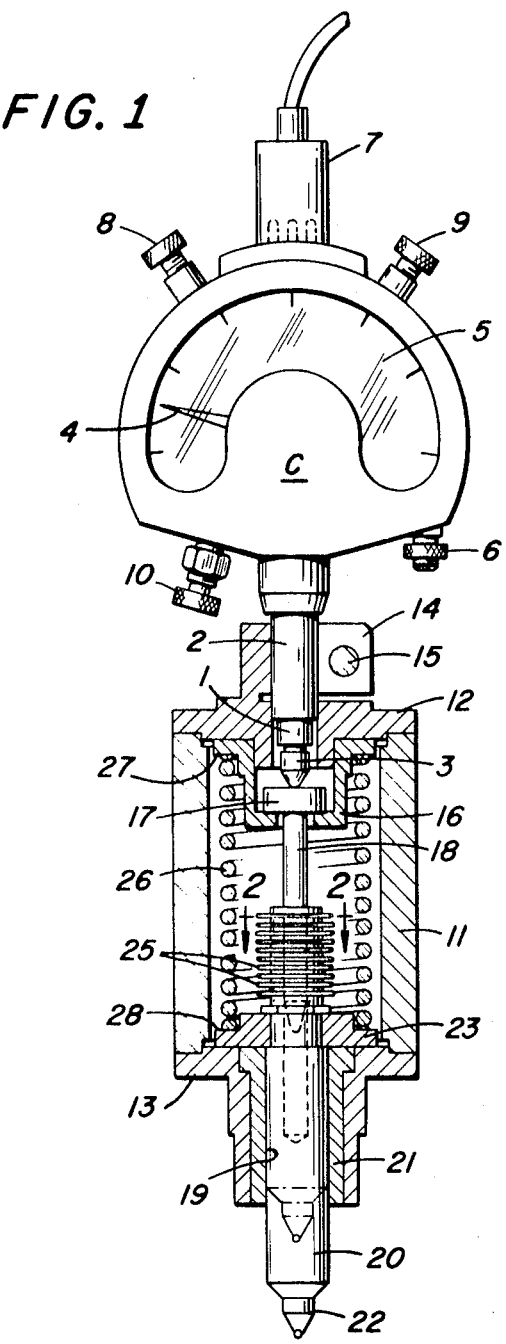
FIG. 1 represents an apparatus, partially sectioned, according to the invention.
Figure 4:
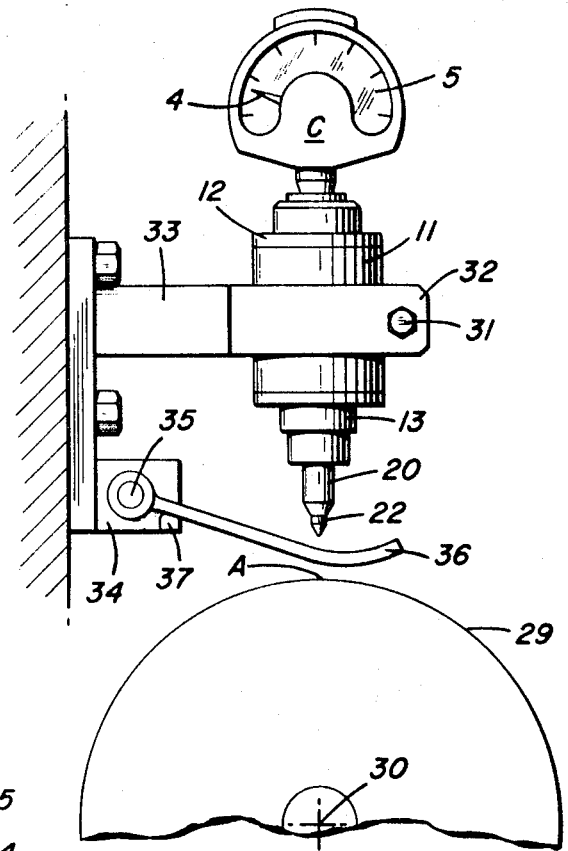
Figure 5:
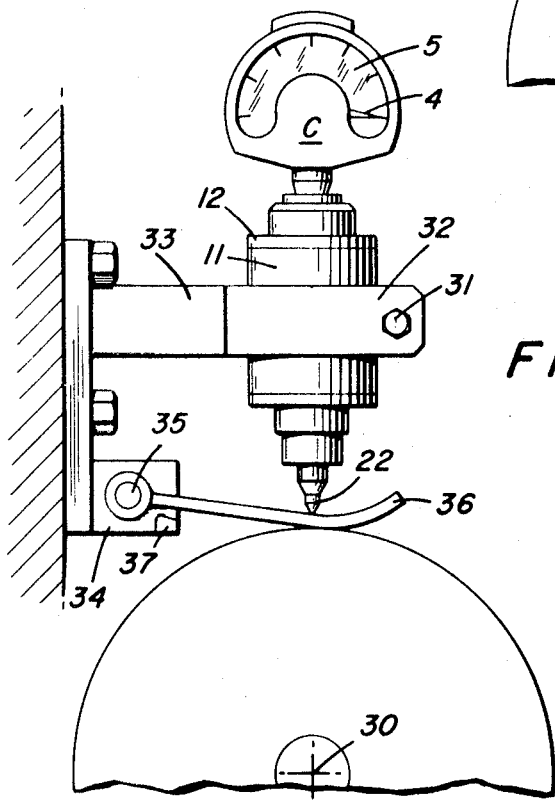
Figure 6:
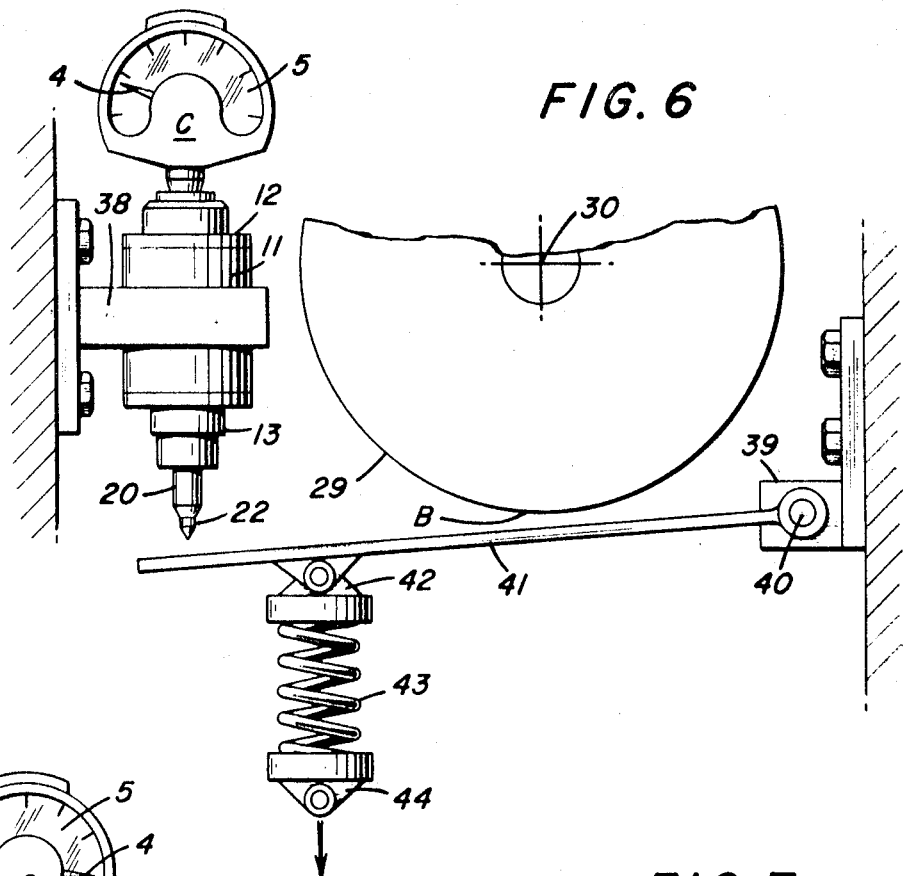
Figure 7:
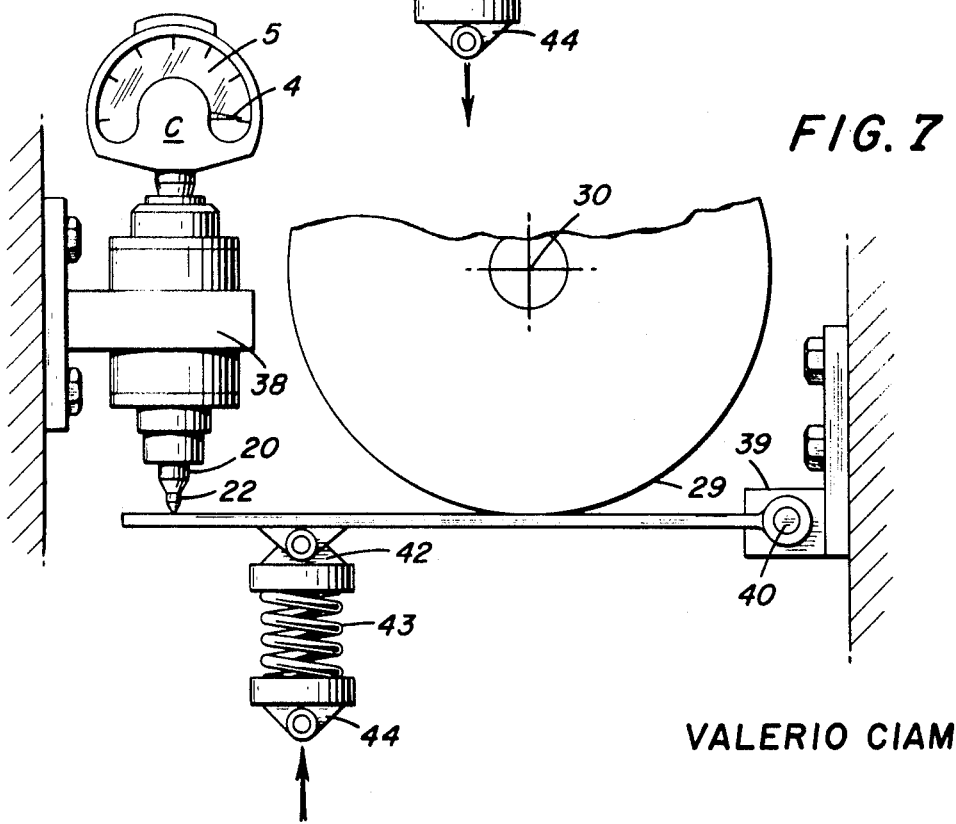

FIGS. 4 and 5 represent diagrammatically the apparatus of FIG. 1, in rest and in operation, respectively during the determination of the differential magnitude of the eccentricity of a cylinder which does not have definite nominal dimensions and rotates about an axis, in which determination the base value of the measurement is that concerning the maximum eccentricity of said cylinder with respect of said axis;

FIGS. 6 and 7 represent diagrammatically the apparatus of FIG. 1, in rest and in operation, respectively, during the determination of the differential magnitude of the eccentricity of a cylinder which does not have definite nominal dimensions and which rotates about an axis, in which determination the base value of the measurement is that concerning the minimum eccentricity of said cylinder with respect to said axis.

The apparatus shown in FIG. 1 comprises a conventional comparator C, constituted by a sensing stem 1, axially slidable in both directions inside a bushing 2 and provided at its free end with a ferrule 3. The opposite end of stem 1 within the comparator, meshes with two levers (not represented in the drawings). One lever is attached to the pointer 4 of the dial 5 and causes the pointer to carry out angular displacements proportional to the axial movements of the stem 1. The other lever exerts an axial pressure on the stem 1 towards the ferrule 3 under the tensile stress exerted by a spring (not shown in the drawings) on the end within the comparator and opposite to that engaged with the ferrule 3. The comparator C comprises moreover a screw 6 for zero setting, a plug 7 for the electric connection of two limit contacts which are closed when the lever integral with the pointer comes into contact with one of them. These contacts are able to actuate a visual or acoustical signaling system, and their position can be adjusted by means of the screws 8 and 9. The functioning of these contacts follows. When the pointer 4, moving to the left from the beginning of the scale which originates at the extreme right of the dial 5, reaches the first limit contact which is adjusted by the screw 9, a green lamp is lighted. The lamp remains in this condition until the pointer reaches the second limit contact which is adjusted by the screw 8. At this moment the green lamp is extinguished and a red lamp is lighted. The red lamp remains in this condition as long as the pointer 4 is at the left of said second limit contact. An additional lamp, for instance a white one, can be provided. The white lamp remains lighted as long as the pointer 4 is at the right of the first limit contact. A screw 10 is used to adjust the pointer during the adjustment of said limit contacts, since these are not visible from the outside.

The apparatus shown in FIG. 1 comprises moreover a cylinder 11 provided with an upper cover 12 and with a lower cover 13, each having an axial opening. The upper cover 12 is provided at its top with a collar 14, to which the bushing 2 is secured by means of the screw 15. A cylindrical cup 16, having a diameter greater than that of the axial opening of cover 12, is secured to the inner face of said cover by removable fastening means. The enlarged head 17 of a rod 18 is slidably assembled within said cup. The other end of the rod 18 is inserted in its turn in the axial opening of the lower cover 13. The ferrule 3 is kept pressed against the head 17 by the spring of comparator C.

Figure 2:
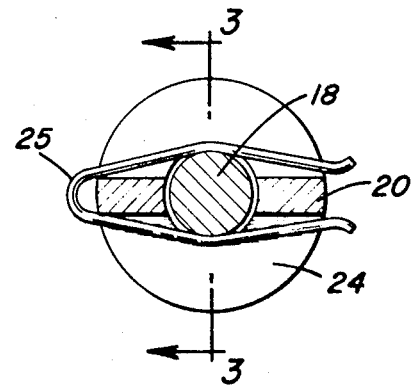
FIG. 2 is a partial section of the apparatus of FIG. 1, taken along plane II—II.
Figure 3:
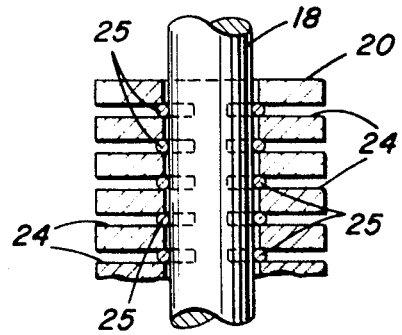
FIG. 3 is a partial section of the apparatus of FIG. 1, taken along plane III—III of FIG. 2.

Shank 20 carries at its lower end a sensing tip 22 and, at an intermediate portion, a disc 23 which rests on cover 13 when point 22 is not engaged. Recesses 24 (see FIGS. 2 and 3) are formed in the upper part of shank 20. Springs 25, for example constituted by elongated U-shaped bronze wires, are inserted in said recesses. The springs are disposed in parallel planes and successive springs are reversed 180°. The springs embrace the lower end of rod 18 in order to exert a frictional gripping action between the latter and shank 20. Inside the cylinder 11 there is a helical compression spring 26, the ends of which press against steps 27 and 28, respectively, formed in cup 16 and in disc 23.

FIGS. 4 and 5 represent the installation of a measuring apparatus, in accordance with the present invention, for measuring the differential magnitude of the eccentricity of a cylinder 29 which does not have well defined nominal dimensions (diagrammatically represented in said figures) and which rotates about an axis 30. The base value in this measuring corresponds to the maximum eccentricity value of the cylinder. The measuring apparatus is secured, by means of a screw 31, in a collar 32 supported by a bracket 33. An underlying bracket 34 carries the pin 35, on which is journalled the slider 36, whose downward rotation is stopped by the stop 37. Conventional means (not shown in the drawings) are provided to obtain a vertical displacement of cylinder 29 in both directions. In FIG. 4, the measuring apparatus is in rest condition, that is, its sensing tip 22 is not in contact with the slider 36, so that the pointer 4 is shifted to the left.

In order to measure the differential eccentricity of cylinder 29, the latter is moved upwardly, as shown in FIG. 5. Then the slider 36, by means of an anticlockwise rotation about pin 35, is brought into contact with the sensing tip 22, and pushes the latter upward. The gripping action of springs 25 on rod 18 causes rod 18 to move upwardly so that the head 17 can come into contact with the lower surface of cover 12 and push against sensing stem 1 and overcome the action of the tension spring contained in comparator C. The pointer 4 is consequently shifted to the beginning of the scale, namely on the right side of dial 5. The comparator C had previously been fixed in the collar 14 in such a position that the position of the head 17 in contact with the cover 12 causes pointer 4 to register with the beginning of the scale. This adjustment is required only once, when the comparator C is secured in the collar 14, and can be correctly made with the aid of the micrometric screw 6.

Now the cylinder 29 is rotated in clockwise or anticlockwise direction, so that its surface, for its whole development, is caused to slide along the underside of the slider 36, starting from the initial point of contact. If the zones of the cylinder which follow that corresponding to point A have an eccentricity greater than said first zone, the feeling point 22 will be again pushed upward and, as the head 17 is already at the upper limit of its stroke, the shank 20 will slide along the rod 18, overcoming the resistance presented by the friction gripping by the springs 25. However the pointer will remain at the beginning of the scale. If, during this first turn, the slider comes into contact with zones having an eccentricity less than that of point A, the rod 18 and the shank 20 will move downward as a result of the pressure of the spring operating against the end of stem 2. Rod 18 and shank 20 will maintain their latest relative position as a result of the friction provided by the springs 25, and the pointer will proportionally move toward the left. At the end of this first turn of cylinder 29, the mutual position of rod 18 and of shank 20 will accurately correspond to the position taken by these elements at the zone of maximum eccentricity of cylinder 29. By rotating the cylinder 29 to make a second turn about the axis 30, in the same direction or in opposite direction, to determine the differential eccentricity of the cylinder, it will be sufficient to read on dial 5 the value of the maximum shifting of the pointer to the left. At the same time it will be possible to determine whether or not said differential eccentricity is within one or both of the pre-established limits as explained above in connection with the limit contacts controlled by adjusting screws 8 and 9.

FIGS. 6 and 7 represent a different installation of a measuring apparatus in accordance with the present invention for measuring the differential magnitude of the eccentricity of a cylinder 29 which does not have well defined nominal dimensions and which rotates about a shaft 30. The base value in this instance corresponds to the minimum eccentricity value of the cylinder. Similarly as represented in FIGS. 4 and 5, the measuring apparatus is supported in a bracket 38. Another bracket 39 supports a pin 40, on which one end of a slider 41 is rotatably assembled. Adjacent the other end of the slider a support 42 for the upper end of a vertically displaceable compression spring 43 is pivotally attached to the slider. The lower support 44 of the spring 43 is connected to conventional means, not shown in the drawings adapted to push support 44 towards the cylinder 29 and to withdraw it therefrom. Contrary to the procedure illustrated in FIGS. 4 and 5, in this instance cylinder 29 is maintained at the same level.

In FIG. 6 the measuring apparatus is in rest condition, as sensing tip 22 is not engaged by the slider. Therefore, as in FIG. 4, the pointer is shifted to the left. In order to measure the differential eccentricity of cylinder 29 with the measuring apparatus installed in this manner, the support 44 is pushed upward so that the spring 43 causes the engagement of the slider 41 with the surface of cylinder 29 at point B and the sensing tip 22 of shank 20 which is pressed upwardly by said slider 41, shank 20 moving rod 18 by reason of the gripping action of springs 25. The head of the rod 18 is therefore again brought into contact with the lower surface of the cover 12, overcoming the action of the tension spring contained in comparator C and connected to stem 1 resting against head 17. The pointer 4 is consequently shifted to the beginning of the scale, on the right side of dial 5, as the comparator C has already been set as explained in connection with FIGS. 4 and 5.

The cylinder 29 is then rotated in clockwise or anticlockwise direction so that during the whole development of its surface, the cylinder is in contact with the slider 41, starting from the initial point of contact B. If the zones of the cylinder which follow that corresponding to point B have an eccentricity less than said first zone, the sensing tip 22 will be again pushed upward by the spring 43 and, as the head 17 is already at the upper limit of its stroke, the shank 20 will slide along the rod 18, overcoming the resistance presented by the friction element provided with the springs 25, but the pointer 4 will remain at the beginning of the scale. If, during the first turn, the slider comes into contact with zones having an eccentricity greater than that of point B, the rod 18 and the shank 20 will move downward, still maintained in their latest relative position by the friction element provided with the springs 25 and the pointer will proportionally move to the left.

At the end of this first turn of cylinder 29, the relative position of rod 18 and of shank 20 will accurately correspond to the position taken by these elements at the zone of minimum eccentricity of cylinder 29. The cylinder 29 is then rotated a second time about the axis 30 in the same direction or in the opposite direction to determine the differential eccentricity of the cylinder. This eccentricity can be read on dial 5 as the value of the maximum displacement of the pointer to the left. In the same way as for FIGS. 4 and 5 it will be possible to determine whether or not said differential eccentricity is within one or both of the pre-established limits.

It is understood that some variations can be carried out in the construction of the above-described apparatus without falling out of the scope of the present invention. So, for instance, the rod and the stem which presses on the latter can be integral, either by constitution or by joining them together. Moreover, said rod and said shank need not necessarily, but only preferably, be coaxial and also the element which opposes to their relative displacement need not be coaxial with said rod and said shank and can have a shape different from that represented in the figures. For instance, the springs can form a tulip-like structure which surrounds one end of the rod.

What is claimed is:

1. A method for measuring differential magnitude with reference to a fixed value corresponding to any of the two measured limit values set on a comparator, which consists in carrying out a first relative movement between the sensing elements of the comparator and the entire surface of the element to be examined, in order to adjust the relative position of the sensing elements so that when the comparator passes the point corresponding to one of the limit values to be measured on said element, the indicator on the comparator will coincide with a pre-established base value on said comparator, and then carrying out a second relative movement, equal to the first and having the same direction or an opposite direction, between said surface and the sensing element in contact with it, and measuring during said second movement at least a value corresponding to one of the displacements of the pointer of the comparator from the pre-established base value.

2. The method according to claim 1, in which the relative movement between the surface of the element to be measured and the sensing elements of the comparator is carried out in such a manner as to firstly make one of the limit values coincident with the pre-established base value, and secondly to determine the difference between the two limit values.

3. The method according to claim 1, in which, when the surface to be measured is of the closed-contour type, the relative movement between said surface and the sensing elements of the comparator is carried out by rotating said surface by at least two turns about an axis, in the same direction or in an opposite direction, one of the limit values being made coincident during the first turn with the pre-established base value and at least a value corresponding to one of the displacements of the pointer of the comparator from the pre-established base value being taken during the subsequent turns.

4. An apparatus for measuring differential magnitudes which comprises a sensing shank adapted to be displaced axially in both directions independently of, or integrally with, a rod adapted to be moved axially within two pre-established limits to operatively displace a pointer on a recording dial, an element to resist independent movement between said shank and said rod, a first resilient element acting on the rod to move same toward the sensing shank, and a second resilient element acting on the shank to axially move it along the rod, the resistance of element opposing said independent movement being always greater than the thrust exerted by the first resilient element on said rod, and always less than the thrust exerted by the second resilient element on the shank.

5. The apparatus according to claim 4, in which said rod and said shank are coaxial.

6. The apparatus according to claim 5, in which one end of the rod is inserted into a well in said sensing shank.

7. The apparatus according to claim 4, in which the element resisting the independent displacement between the sensing shank and the rod is a friction element.

8. The apparatus according to claim 7, in which said friction element is interposed between the sensing shank and the end of the rod inserted in the well in the shank.

9. The apparatus according to claim 8, in which said friction element is constituted by a plurality of springs surrounding the end of the rod inserted in said well.

10. The apparatus according to claim 9, in which said springs are of an elongated U-shape.

11. The apparatus according to claim 10, in which said springs are disposed in parallel planes and successive springs are reversed 180°.

12. The apparatus according to claim 9, in which said springs are in the shape of tulip petals.

13. The apparatus according to claim 4, in which the rod is provided with a thickened end to limit the stroke of the rod in both directions.

14. The apparatus according to claim 13, in which said thickened end corresponds to the end of the rod opposite to the end nearest the sensing shank, a stem being further provided, one end of which is always kept pressed against said thickened end by said first resilient element and the other end of which is operatively connected to said pointer.

15. The apparatus according to claim 14, in which the first end of said stem is adjustably screwed into said thickened end.

16. The apparatus according to claim 4, including a cylindrical housing, the bottom end of said housing having an axial bore in which said shank is slidably mounted, said shank being provided with a disc, integral with it and intended to rest on the inner surface of said bottom, the upper end of said housing also being provided with an axial bore in which said rod is slidably mounted, the stroke of said rod being limited in both directions by said thickened end which limits the axial movement to said rod between the inner surface of said upper end and a cup-shaped element having a horizontal surface parallel to and spaced interiorly from said upper end, the said second resilient element being constituted by a helical compression spring, whose ends rest against the upper surface of the disc integral with the shank and against the said cup-shaped element.

17. The apparatus according to claim 16, in which a stem is slidably mounted in the axial hole of said upper end, the stem having one end operatively connected to said pointer and the other end always pressed by said first resilient element into continuous contact with said thickened end of said rod.

18. The apparatus according to claim 17, comprising a means adapted to vary the position of a support, in which said stem is slidable, with respect to said cylindrical housing.

19. The apparatus according to claim 4, comprising at least an electric contact on said dial adapted to energize a visual or acoustical signaling system, when its position is reached by said pointer.

20. The apparatus according to claim 19, comprising several electric contacts able to energize a signaling system at the interval corresponding on the dial to the distance between two subsequent electric contacts.

References Cited

UNITED STATES PATENTS

| | | | |
|---|---|---|---|
| 2,406,514 | 8/1946 | Squire | 33—172 R |
| 2,507,727 | 5/1950 | Loxham | 33—172 R |
| 2,615,254 | 10/1952 | Worthen | 33—172 R |
| 2,660,798 | 12/1953 | Delaney | 33—172 R |
| 2,741,032 | 4/1956 | Emery | 33—172 R |

WILLIAM D. MARTIN, Jr., Primary Examiner

U.S. Cl. X.R.

33—147 H, 174 Q